United States Patent [19]
Patterson

[11] Patent Number: 5,004,145
[45] Date of Patent: Apr. 2, 1991

[54] CARTON HANDLING DEVICE

[76] Inventor: E. Ennalls Patterson, 2053 Cressman Rd., Box 605, Skippack, Pa. 19474

[21] Appl. No.: 567,616

[22] Filed: Aug. 15, 1990

[51] Int. Cl.$^5$ .............................................. B65D 5/46
[52] U.S. Cl. ........................... 229/117.26; 229/117.23; 229/125.42
[58] Field of Search ...................... 229/117.23, 117.26, 229/125.42; 206/621.1, 621.2, 631.3, 200; 220/94 R

[56] References Cited

U.S. PATENT DOCUMENTS

| | | | |
|---|---|---|---|
| 2,936,927 | 5/1960 | Peters | 229/117.23 |
| 3,000,536 | 9/1961 | Roy | 220/94 R |
| 3,056,622 | 10/1962 | Hilderbrandt et al. | 229/125.42 |
| 3,096,924 | 7/1963 | Young | 229/125.42 |
| 3,209,982 | 10/1965 | Laster et al. | 229/117.23 |
| 3,250,562 | 5/1966 | Frasure et al. | 229/117.23 |
| 3,924,797 | 12/1975 | Furbeck | 206/631.3 |

FOREIGN PATENT DOCUMENTS

| | | | |
|---|---|---|---|
| 522279 | 3/1956 | Canada | 229/117.23 |
| 1203669 | 10/1965 | German Democratic Rep. | 229/117.23 |

Primary Examiner—Gary E. Elkins
Attorney, Agent, or Firm—Joseph W. Molasky & Assocs.

[57] ABSTRACT

A large capacity biodegradable container handling device for easy transport. The handle is designed for facile attachment to the container and for grasping with the tips of the fingers. The handle includes a backing panel to provide support for the main body of the container against a forceful finger insertion.

10 Claims, 3 Drawing Sheets

CARTON HANDLING DEVICE

BACKGROUND OF THE INVENTION

This invention relates in general to large capacity containers which can be manually transportable and, in particular, to such containers on which a specialized gripping device is attached for easy handling.

It has been well recognized by the environmental community that present day use of plastic containers for transporting and handling various liquid and dry products is not satisfactory for several reasons.

One reason for the unsatisfactory status of prior art plastic containers, especially in the milk industry, is that they are environmentally harmful in view of their non-biodegradability. This is a well recognized problem since milk is conventionally marketed in supermarkets and elsewhere in economy sized plasticized gallon containers and these containers when emptied are relegated to various land fills. The discarding of numerous plastic containers accounts for a large percentage of landfill usage in today's most pressing environmental problem.

It has also become evident to the citizenry as well as political leaders that a crisis condition is occurring throughout the world and, particularly, in the United States as the nation runs out of land fills in which to deposit non-biodegradable plastic containers and other like products.

It is the purpose of this invention to alleviate the problems associated with plastic receptacles by providing biodegradable containers of increased size and capacity. Such larger containers reduce the number of containers that are disposed of thereby alleviating the landfill problem as well as allowing those discarded containers to be disintegrated by natural forces such as bacterias.

The present invention has facilitated the transporting of the larger biodegradable container by use of a unique handle attached thereto. The handle allows persons of various arm strengths to handle the large containers with relative ease.

SUMMARY OF THE INVENTION

An environmentally safe large capacity container with a handle has been devised for lifting and carrying products such as liquids or solids. The handled container is particularly suitable for transporting liquid products as, for example, milk from store to home with relative ease and, for pouring such liquid into a glass or receptacle.

The handle has been designed for simplified attachment to the main body of the container by two wing tabs which allow it to be fixedly joined to several of the container's surfaces to assure that the handle will not break away from the main body of the container when it is at full capacity and therefore is fully weighted.

The tabs are configured with respect to the container body such that a large and wide opening is provided by the handle for easy partial insertion of the carrier's fingers.

The handle is also integrally formed with a support panel for re-enforcing the side of the container juxtaposed to handle which receives the force of the knuckles as the fingers are inserted.

It is therefor an object of this invention to provide an environmentally safe container for use in heavy, liquid or dry measure applications.

It is also an object of this invention to provide a container bearing heavy liquid or dry measure which can be readily transported from place to place.

It is an additional object of this invention to provide a large capacity container that will allow for relatively easy transporting and pouring into another receptacle.

DESCRIPTION OF THE PREFERRED EMBODIMENTS

Figure 1:
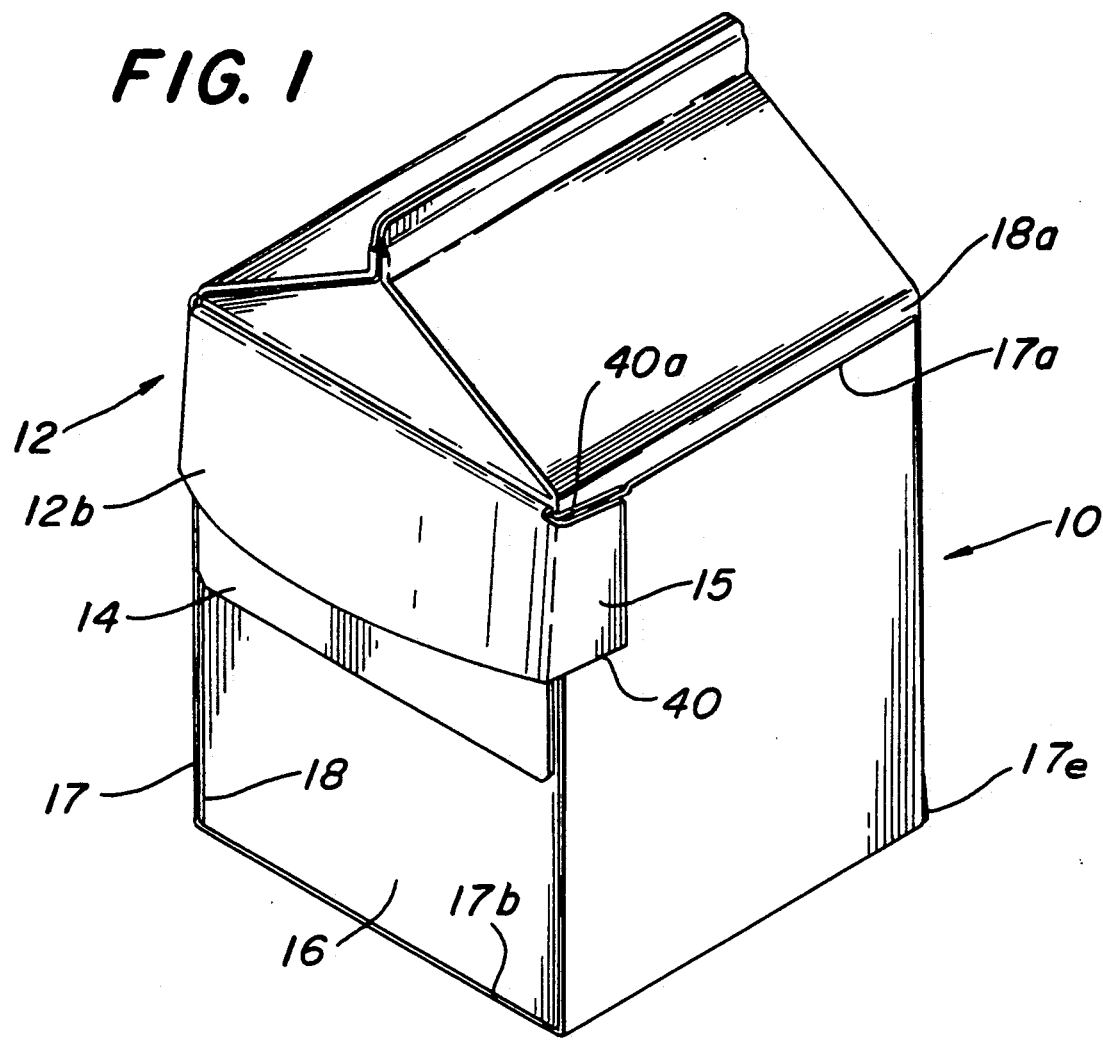
FIG. 1 is a perspective view of the biodegradable container of the invention including its handle for ease of transport and handling.

The perspective view of FIG. 1 illustrates the biodegradable container 10 of the invention with the horizontally oriented handle 12. The container 10 is made of a paper product such as cardboard coated with polyethylene and is designed to carry large capacities and heavy weights of dry or liquid products. In a preferred embodiment, the container 10 has a capacity of one gallon and therefore is particularly suitable for holding liquid products such as milk.

Figure 5:
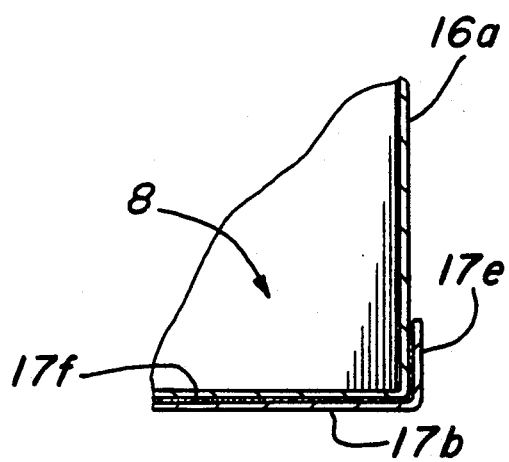
FIG. 5 is a sectional view showing the reinforcing tab located along a bottom panel of the container.

The side panels 18, 18a and the bottom of 8 are covered by an integrally formed support panel comprised of three sections 17, 17a and 17b all of which have the same and composition. The support panel is attached to the side panels 18, 18a and bottom 8 by adhesives 17d and 17f or by heat induced fusion; as understood in the art, polyethylene surfaces may be bonded to one another by induced heat. The tri-sectional support panel comprising sections 17, 17a, 17b not only serves its primary function of reinforcing the sides and bottom 8 of container 10, but also provides a means for attachment of the handle 12 as will be discussed hereinbelow. The support includes a lip 17e (see FIGS. 1 and 5) which is an extension of bottom support section 17b and is utilized to further reinforce the container 10 when it is completely folded into its container configuration during manufacture.

Figure 2:
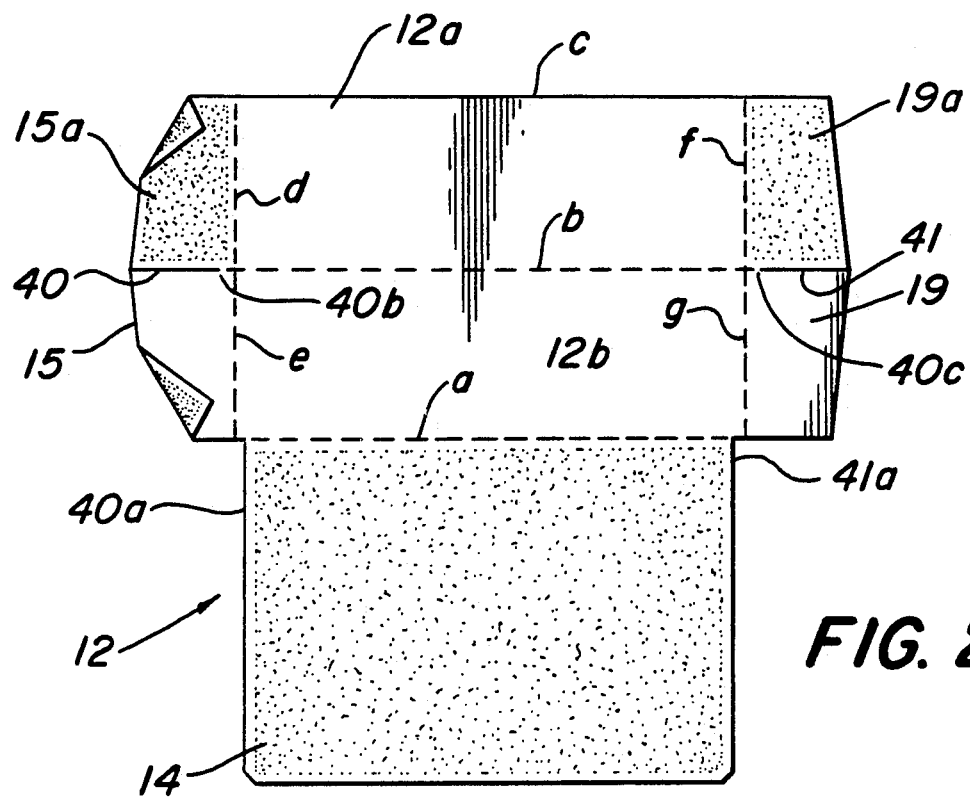
FIG. 2 is a plan view of the handle of the invention but in an unfolded state.

The design of the handle 12, which is of the same material and gauge as the components of the container 10 and tri-sectional support in an unfolded and flat state, is depicted in FIG. 2 where the dotted lines a, b, d, e, f and g indicate the locations where folds occur in forming the handle. The handle 12 is an integral unit composed of various parts consisting of a backing panel 14, dual wing sets 15, 15a and 19, 19a, handle sections 12a, 12b and slits 40, 41 respectively positioned between each dual wing set. It is to be noted that the respective slits 40, 41, do not extend up to the fold lines d-e and f-g by respective distances 40b, 40c. Certain faces of the handle 12 in FIG. 2 are speckled to indicate they have an adhesive or may be fused by induced heat applied thereto. Adhesive is applied to an upper surface of panel 14, upper surfaces of the winges 15a, 19a and undersurfaces of the wings 15, 15a, 19, 19a.

Figure 6:
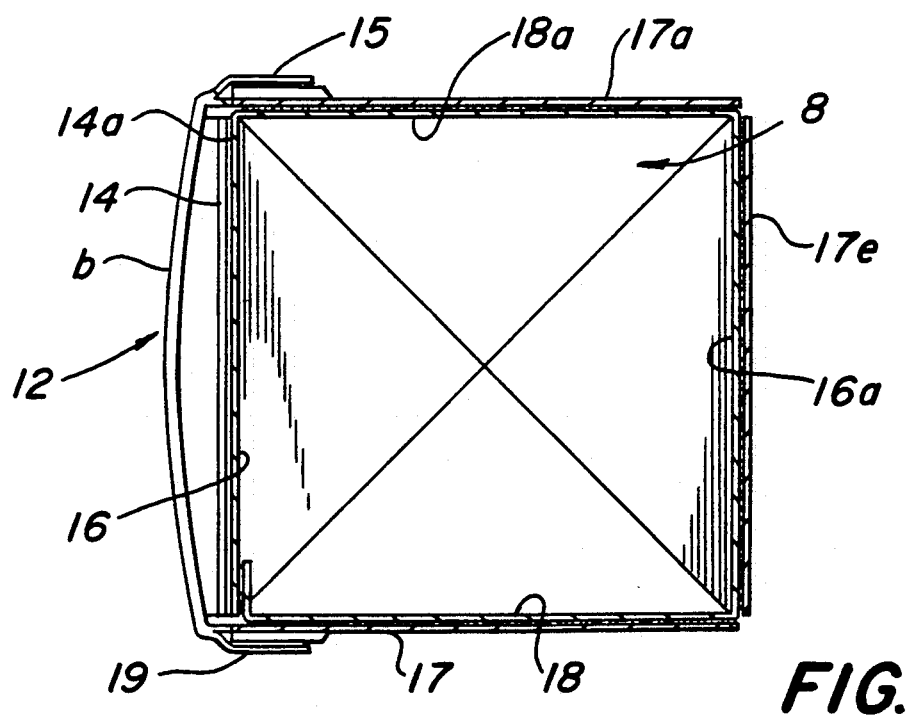
FIG. 6 is another sectional plan view of the biodegradable container illustrating further reinforcing side paneling.
Figure 4:
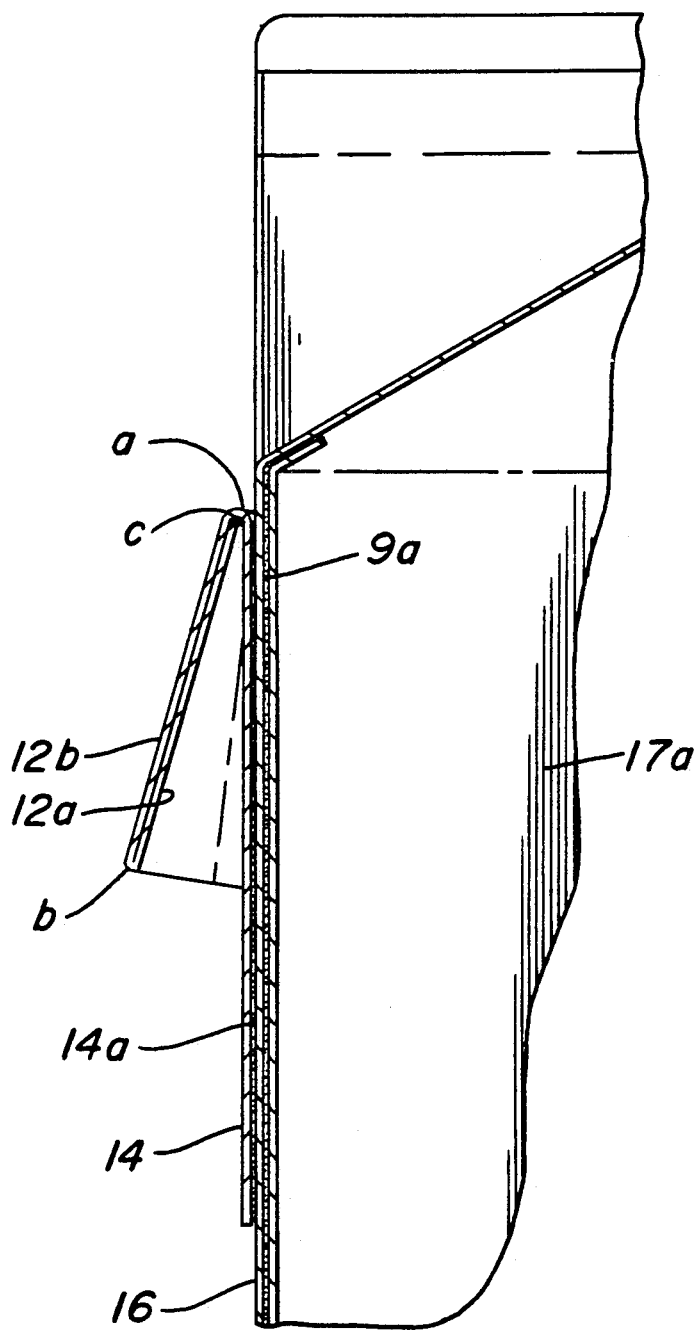
FIG. 4 is a sectional view of the container through the handle depicting the outward spacing of the handle with respect to a container side panel for easy finger insertion.

When the handle 12 is in a folded condition panel 12a is folded under panel 12b at the intersection of line b; thereafter, both panels 12a, 12b are folded under support panel 14 at line a. The handle assembly 12 is then attached to the container 10 so that the upper surface of the backing panel 14 with adhesive 14a (see FIG. 4) lies against the side panel 16. In this arrangement, the top of the fold a is substantially aligned with the top of the side panels 16 and is coincident with edge c. This handle configuration allows the fold along dotted line b to be relatively smooth (see FIG. 6) to allow for ease of transport and handling, since this fold comes into direct contact with the hand.

Figure 3:
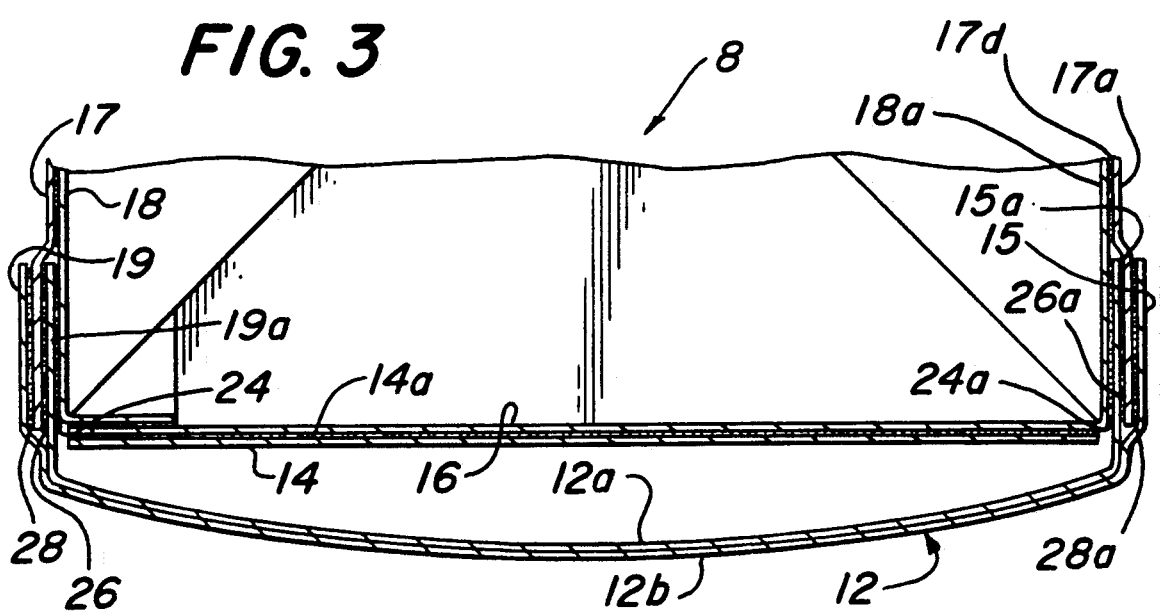
FIG. 3 is a sectional view illustrating the attachment of the handle in a folded state with respect to the main body of the container.

The sectional view of FIG. 3 illustrates the manner in which the handle 12 is firmly attached to the container 10. The dual wing sets 15, 15a and 19, 19a are folded along the dotted lines d-e and f-g (see FIG. 2) and is adapted for attachment after the protective panel 14 is applied to side panel 16. One set of the wings 19, 19a is arranged such that one wing 19a, which has an adhesive 24, 26 applied on either surface, is fixedly positioned between the side panel 18 and the unitary support panel 17. The second wing 19 has an adhesive 28 placed upon an inside surface and is attached to the outside surface of support panel 17.

The set of wings 15, 15a are similarly attached to the container 10. Accordingly, the wing 15a, which has adhesives 24a, 26a applied on either side, is fixedly joined to the outside surface of side panel 18a as well as to the inside surface of the unitary support panel 17a. In like manner, the inside surface of the wing 15 is joined to the outside surface of the support 17a.

The dual wing sets allow the handle 12 to be easily but securely attached to the container 10 so that it cannot be separated therefrom. The handle 12 therefore inspires confidence as well as comfort to the user over its ability to permit a heavy load to be handled and transported without fear that it will be separated from the container and damaged by falling or dropping.

Referring again to FIG. 2, it is recalled that the slits 40, 41 provided between the dual wings 15, 15a and 19, 19a do not extend to the fold lines d-e and f-g. This is significant in the placement of the handle which is designed to form a pouch-like opening that may be easily grasped by the tips of the fingers for facile transporting and handling.

To achieve the above-mentioned pouch-like attribute for the handle 12, the slits 40, 41 prevent the lower part along fold b (see FIG. 4) of the folded over wings 15, 15a and 19, 19a to be further removed from the backing panel 14 than the upper part along fold a when attached to the container 12, This arrangement of the handle 12 with respect to the container 10 may also be viewed in FIG. 1 where it is appreciated that the upper slit formed by the folding of section 12a under section 12b is limited by edge 40a when located between side panel 18a and the section 17a of the unitary support panel; and, therefore, since the edge 40a is further inward than the fold line d-e, the upper part of the handle 12 may be inserted against support panel 17a and against protective panel 14. Similarly, the slit 40 allows entrance between side panel 18a and support section 17a; however, the handle along fold b is removed from the edge of the section 17a and side panel 16 by the distance 40b. As a result, the bottom of the handle juts out further than does the upper portion.

In a similar manner, the edge 41a and slit 41 of handle 12 when respectively inserted between side panel 18 and inside and outside surfaces of support 17 enable the upper section of the handle to lie in juxtaposition to the protective panel 14 and the bottom section to be removed therefrom by a distance 40c. These structural aspects of the handle 12 with respect to the container 10 account for a grasping device which permits easy insection of the fingers as may be appreciated by referring to FIG. 4.

In summary, a biodegradable container for varied dry and liquid use is disclosed which incorporates a handle device for facilitating its carrying and handling. The container and handle have been devised to improve environmental problems associated with the discarding of plastic bottles used for popular products such as milk into land fills. The design of the container of the invention minimizes the number used by the public in view of its large capacity capability in dry or liquid measure that they can accommodate. The biodegradability and large capacity of the present container invention directly contribute to the ameliorations of landfill problems being faced by municipalities of local, state and country governments.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A biodegradable handling assembly comprising:
   (a) a member having side panels and a bottom area for holding dry or, alternatively, liquid measure;
   (b) means attached to said member for pouring said dry or liquid measure therefrom;
   (c) a handle means horizontally attached and extending across one said side panel of said member; and
   (d) said handle means being formed into a pouch-like opening to accommodate partial insertion of the fingers for ease of transporting from place to place and for pouring from said member.

2. A biodegradable handling assembly in accordance with claim 1 wherein said handle means is placed in a folded state and the fold is located along the bottom to provide a smooth surface for grasping.

3. A biodegradable handling assembly in accordance with claim 2 wherein said handle means further comprises a backing member integrally formed with handle means and joined to one said side panel.

4. A biodegradable handling assembly in accordance with claim 3 wherein said handle means further comprises extension means for connecting said handle means to side panels adjacent the side panel facing said handle means.

5. A biodegradable handling assembly in accordance with claim 4 wherein said extension means comprises dual wings and each respective dual wings being located on opposite sides of said handle.

6. A biodegradable handling assembly in accordance with claim 5 wherein each respective dual wings being cut on a bias for attaching to said member.

7. A biodegradable handling assembly in accordance with claim 6 wherein each said dual wings are provided with a slit to generate a total of four wings.

8. A biodegradable handling assembly in accordance with claim 6 wherein the placement of said dual wing extensions are placed upon said side panels so that said bias cut is oriented vertically to form said handle means into a pocket for convenient grasping by said fingers.

9. A biodegradable handling assembly in accordance with claim 7 and further including supports located on respective side panels to the side panel facing said handle.

10. A biodegradable handling assembly in accordance with claim 9 wherein said respective dual wings are attached to said container by joining one said dual wing under said support to said container, and the other said dual wing being oriented over said support and joined thereto.

* * * * *